United States Patent [19]
Kazama

[11] Patent Number: 5,943,188
[45] Date of Patent: Aug. 24, 1999

[54] MAGNETIC HEAD DEVICE

[75] Inventor: Toshio Kazama, Niigata-ken, Japan

[73] Assignee: Alps Electric Co., Ltd., Tokyo, Japan

[21] Appl. No.: 08/946,499

[22] Filed: Oct. 7, 1997

[30] Foreign Application Priority Data

Oct. 14, 1996 [JP] Japan ................................. 8-270924

[51] Int. Cl.⁶ ........................... G11B 5/105; G11B 5/265; G11B 5/60
[52] U.S. Cl. ........................................... 360/103; 360/121
[58] Field of Search ................................. 360/103, 125, 360/121; 369/13

[56] References Cited

U.S. PATENT DOCUMENTS

| | | | |
|---|---|---|---|
| 3,940,798 | 2/1976 | Rumpler | 360/121 |
| 5,151,837 | 9/1992 | Wakasugi et al. | 360/103 |
| 5,444,678 | 8/1995 | Ogata | 369/13 |
| 5,485,336 | 1/1996 | Matsunga | 360/103 |
| 5,572,490 | 11/1996 | Kazama | 369/13 |

*Primary Examiner*—Robert S. Tupper
*Attorney, Agent, or Firm*—Brinks Hofer Gilson & Lione

[57] ABSTRACT

In a magnetic head device, I-shaped side and center cores are fitted to a slider, and magnetic gaps are formed by a part of the slider. Therefore, a magnetic path can be shortened, and the magnetic head device is constructed so as not to leave strains on the cores, so that the core loss is low. In addition, a back core (back plate) having a wide area is provided, so that heat-dissipating effect is enhanced. Therefore, magnetic field-generating efficiency can be improved in wide frequency bands. Further, by decreasing the number of turns of a coil, the inductance, the impedance, and the loss factor can be reduced.

14 Claims, 8 Drawing Sheets

MAGNETIC HEAD DEVICE

BACKGROUND OF THE INVENTION

1. Field of the Invention

The present invention relates to a flying magnetic head device installed in magneto-optical disk apparatus, etc., and more particularly, to a magnetic head device which is capable of suppressing heat generation by reducing the core loss in a magnetic field generating section provided in the magnetic head device, and which can stably be used even in a high-frequency region by increasing heat-dissipating efficiency against the heat generation.

2. Description of the Related Art

FIG. 7 is a partially exploded perspective view illustrating a conventional flying magnetic head device installed in a magneto-optical disk apparatus; and FIG. 8 is an exploded perspective view illustrating a core assembly held by a slider of the magnetic head device of FIG. 7.

The magnetic head device is composed of a head main body 1 and support members (not shown) for supporting the head main body 1.

The head main body 1 includes a slider 2 and a core assembly 5 (see FIG. 8) held in the slider 2. The slider is formed of a non-magnetic material, such as ceramic or the like, and the bottom side shown in FIG. 7 of the slider 2 constitutes the surface opposed to a recording medium. The top surface side of the slider 2 is supported by the support members, and protrusions 2a, 2b, 2c, 2d, 2e, and 2f are formed thereon. Grooves 3a, 3b, and 3c are formed in the protrusions 2a, 2b, and 2c, respectively. The core assembly is held in the grooves 3a and 3b, and the bottom surface of the core assembly 5 is flush with the surface of the slider 2 opposed to the recording medium.

As shown in FIG. 8, the core assembly 5 is composed of a center core 6, substantially L-shaped side cores 7 joined to both sides of the center core 6, and a back core 11 joined to end surfaces of the center core 6 and the side cores 7. A bobbin 10 around which a coil 9 is wound is fitted onto the center core 6. The center core 6 and the side cores 7 are joined by means of a non-magnetic material 8, such as glass. On the bottom side of the core assembly 5, a pair of magnetic gaps G are formed adjacent to each other on the surface to which the center core 6 and the side cores 7 are opposed. When the core assembly 5 is mounted to the slider 2, as shown in FIG. 7, the back core 11 is fitted into the grooves 3a and 3b.

Numeral 12 indicates a flexure formed of a thin plate spring or the like. A hatching region 12a of the flexure is glued and secured to the top surface 2g surrounded by the protrusions 2a, 2b, 2c, 2d, 2e, and 2f of the slider 2, and the other hatching region 12b of the flexure is glued and secured to the bottom surface of a load beam. The slider 2 is elastically supported by the tip of the load beam through the flexure 12.

The bottom side of the conventional magnetic head device is directed to the surface of a magnetic recording medium, and is pressed into contact with the recording medium by the load beam with a light elastic force. In a magneto-optical disk apparatus, a laser beam is illuminated on the surface of the recording medium from the opposite side of the magnetic head device, and in synchronism therewith, a vertical magnetic field is applied to the magnetic recording medium from the section between the center core and the side cores 7, so that a signal is recorded in the recording medium due to light modulation or magnetic modulation.

When high-density recording is to be performed on the recording medium using the magnetic head device of this type, it is generally required to apply an AC magnetic field of high frequency to the recording medium. Thus, it is necessary to increase the frequency of a current applied to the coil 9.

However, according to the conventional magnetic head device constructed as described above, when the magnetic field of high frequency is to be generated, the heat generated in the core assembly 5 is increased. The heat generation is attributed to core loss (iron loss) such as hysteresis loss and eddy current loss in a magnetic material forming a magnetic path in a magnetic field generating section, i.e., in the center, side and back cores 6, 7 and 11, and further to direct current resistance (copper loss) of the coil 9 provided in the magnetic field generating section. The loss becomes larger in higher frequency bands. In addition, in the magnetic head device shown in FIG. 7, dissipation of the heat generated in the core assembly 5 is poor, and it is difficult for the heat to escape to the outside. Therefore, the core loss due to the heat generation increases, whereby the magnetic field-generating efficiency is further deteriorated.

In addition, in the manufacturing process of the core assembly 5, a magnetic material block having an I-shaped cross-sectional configuration and two L-shaped magnetic material blocks are joined by means of a glass material to form a block having an E-shaped cross-sectional configuration, and the block is cut to have a predetermined thickness to form an E-shaped core 5a shown in FIG. 8 in which the center core 6 and the side cores 7 are joined by means of non-magnetic materials 8.

However, since the manufacturing work of the E-shaped core 5a is complicated, and a large number of steps are required for machining, machining strains are likely to remain on the center and side cores 6 and 7, and stress is likely to act on the glued interface with the non-magnetic materials 8 to impart strain thereon. The magnetic field-generating efficiency is also deteriorated by the machining strain and the gluing strain.

SUMMARY OF THE INVENTION

It is an object of the present invention to provide a magnetic head device which suppresses rise in temperature in a magnetic head, and increases the magnetic field-generating efficiency by reducing core loss and increasing heat-dissipating efficiency in the magnetic head, and which can comply with high-density recording.

It is another object of the present invention to provide a magnetic head device which facilitates an assembly operation by simplifying the structure of a magnetic field generating section, and which reduces a tendency of machining strain to remain on the cores.

In one aspect of the present invention, there is provided a magnetic head device, comprising: a slider formed of a non-magnetic material; two or more cores formed of a magnetic material to be mounted to the slider; and a coil formed around at least one of the cores, wherein one end of each of the cores is fitted to the slider, and gaps are formed between the cores through the partial intermediation of the slider, and wherein a back core is joined to the other end of each of the cores.

In the above construction, each of the cores can be formed in the shape of an elongated block.

In another aspect of the present invention, there is provided a magnetic head device, comprising: a slider formed of a non-magnetic material; two ore more cores formed of a magnetic material to be mounted to the slider; magnetic gaps formed by the intermediation of non-magnetic materials between the tips of the cores; and a coil formed around at least one of the cores, wherein a back core formed in the shape of a flat plate is joined to base end surfaces of the cores, and wherein the area of the back core is equal to or larger than a total of areas of the base end surfaces of the cores and areas of sections sandwiched by base end surfaces of cores.

In the above construction, it is preferable that columns extending parallel to the cores are integrally formed on the slider, and that the back core is joined to end surfaces of the cores and end surfaces of the columns. In addition, the each of the cores may be preferably embedded in each of the core.

Further, a suspension for elastically supporting the overall head can be mounted to the back core.

According to the magnetic head device of the present invention, the cores are fitted to the slider, and magnetic field generating sections are formed with the gaps formed by the partial intermediation of the slider therebetween. In this structure, the cores can be constructed only by I-shaped cores, and a magnetic path can be formed into a shape simpler than that of the conventional magnetic head device shown in FIG. 8 in which the L-shaped side cores 7 are used, so that the total volume of the cores can be reduced. In general, the core loss (hysteresis loss and eddy current loss) is shown by an amount of power consumption per unit volume ($W/m^3$). Therefore, the volume of the overall magnetic field generating sections can be reduced, whereby it is possible to reduce the core loss caused in the magnetic field generating sections. Further, when the magnetic field generating sections are constructed with a combination of the I-shaped cores, there is no strain due to machining of the cores, and stress acting on the glued interface with the glass material, etc. is eliminated. Thus, the strains of the overall cores are reduced, thereby suppressing a reduction in magnetic permeability due to inverse magnetostriction.

In addition, according to the magnetic head device of the present invention, magnetic field generating-efficiency in the magnetic field generating sections can be increased as compared with the conventional magnetic head device, so that the number of turns of the coil can be reduced. Thus, the direct current resistance of the coil can be reduced as shown in FIGS. 3 to 6, so that the power consumption of the coil can be cut down. In addition, it is possible to reduce the impedance of the magnetic field generating sections.

Further, in the magnetic head device of the present invention, the columns parallel to the cores are formed on the slider, and the back core having a wide area such that the back core can be mounted on the end surfaces of the cores and columns is provided. Thus, the heat generated in the cores is efficiently dissipated from the back core, thereby suppressing heat generation in the magnetic field generating sections. By suppressing the heat generation, the core loss can be further reduced. In addition, by joining the cores and the back core through the intermediation of a thin layer formed of a non-conductive material, the eddy current loss between the cores and the back core can be prevented, thereby further reducing the core loss.

Still further, a flexure and a gimbal constituting the suspension can directly be mounted to the slider, so that the suspension can easily be mounted even to a small-sized slider.

DESCRIPTION OF THE PREFERRED EMBODIMENT

The present invention will now be described with reference to the drawings.

Figure 1:
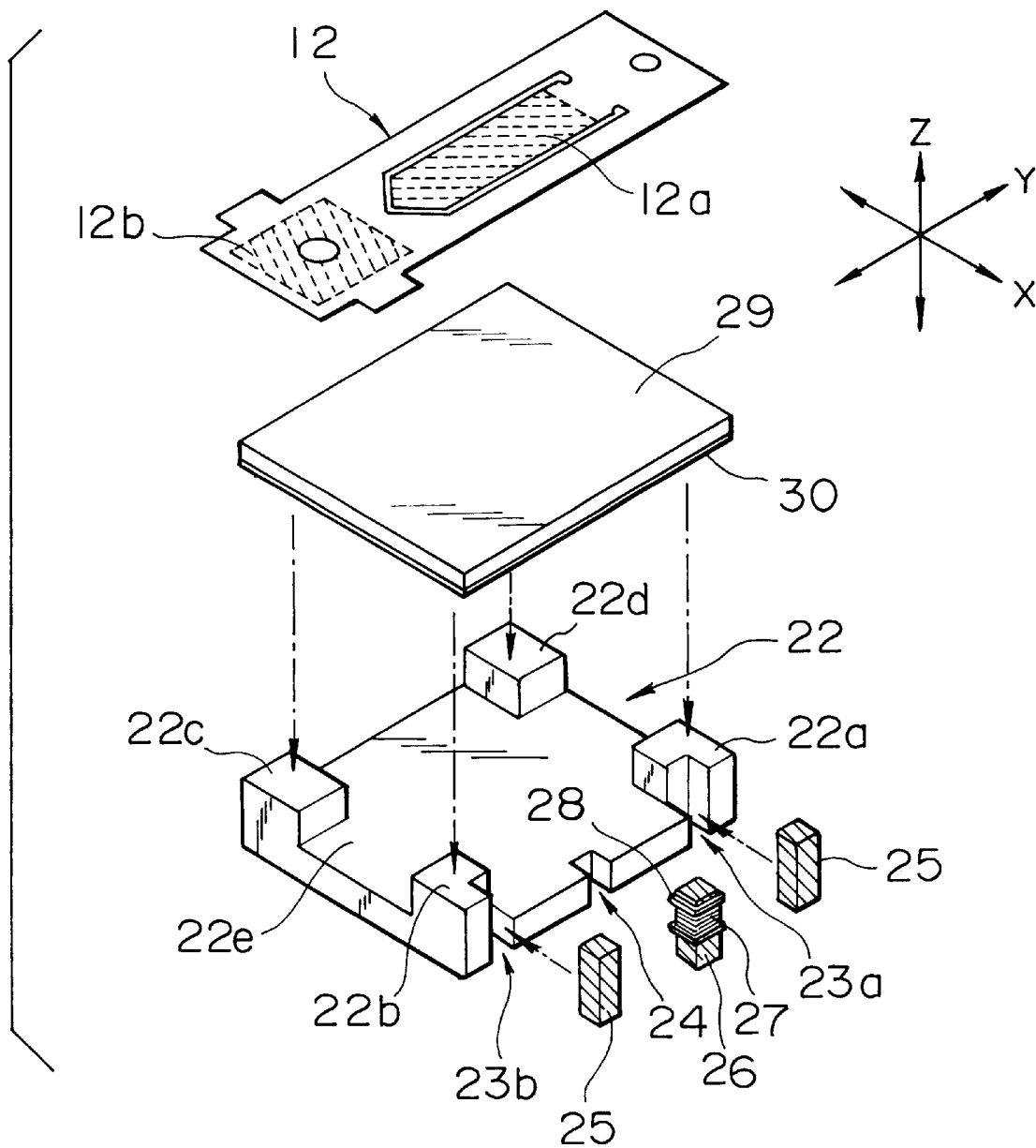
FIG. 1 is an exploded perspective view illustrating an embodiment of a magnetic head device according to the present invention.
Figure 2A:
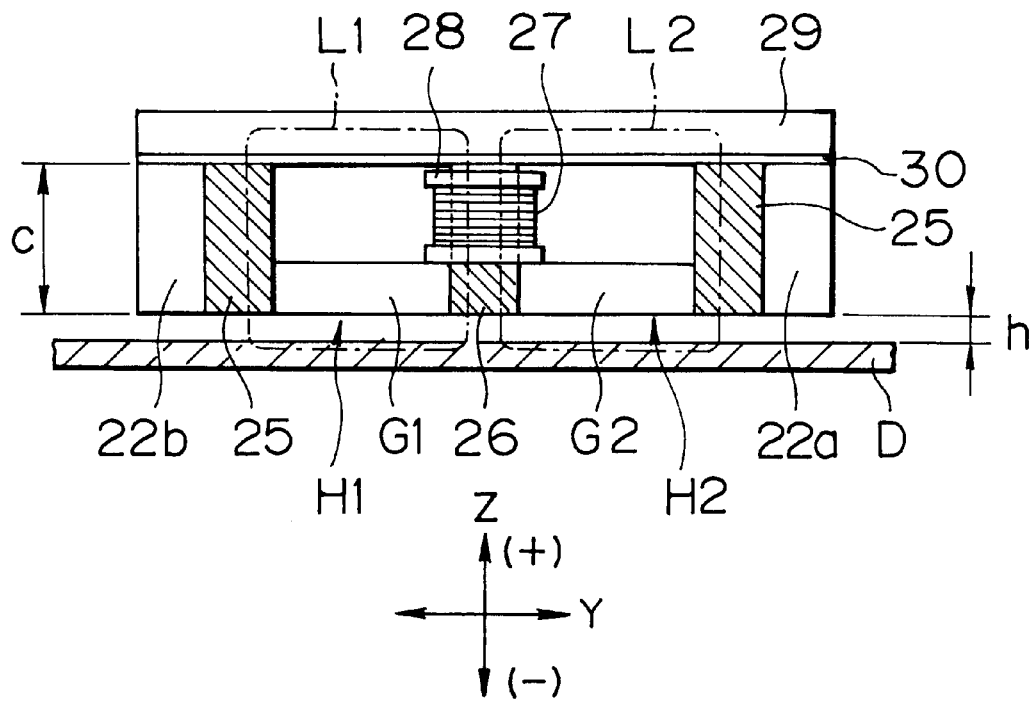
FIG. 2A is a front view of the magnetic head device of FIG. 1.
Figure 2B:
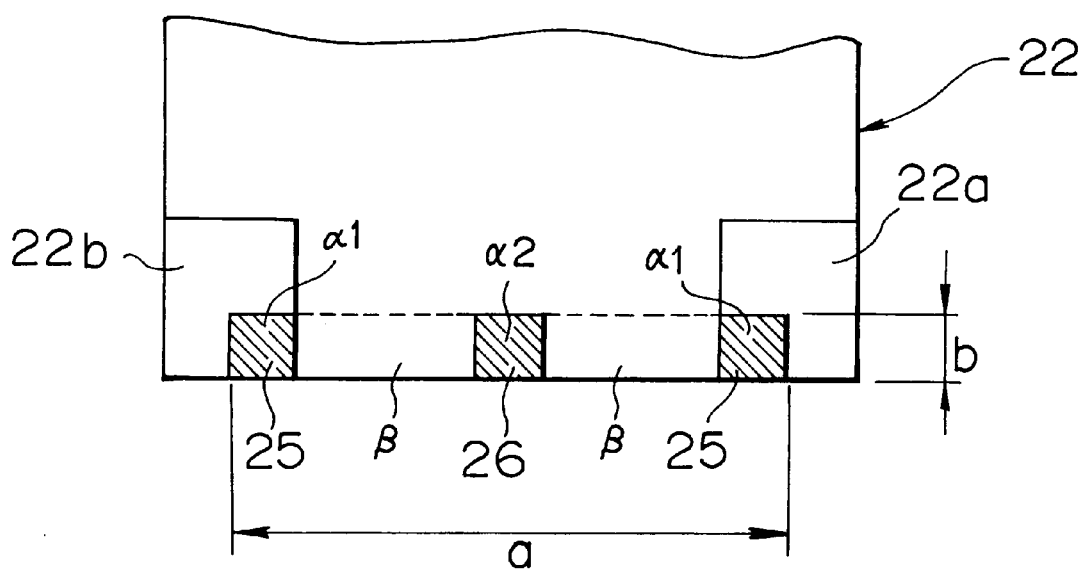
FIG. 2B is a partial plan view thereof.

FIG. 1 is an exploded perspective view showing an embodiment of a magnetic head device of the present invention; FIG. 2A is a front view of the magnetic device; and FIG. 2B is a plan view of the magnetic device.

Referring to FIG. 1, a slider 22 is formed of a non-magnetic ceramic material, such as calcium titanate ($CaTiO_3$). Columns 22a, 22b, 22c, and 22d each extending in the direction of the Z-axis shown in the drawing are integrally formed on four corners of the slider 22, respectively. In addition, cutout grooves 23a and 23b are formed in the columns 22a and 22b, respectively, and a cutout groove 24 is also formed in a base 22e at the position between the columns 22a and 22b. Side cores 25 formed in the shape of an elongated block are fitted and secured to the cutout grooves 23a and 23b, respectively, by gluing or the like. A center core 26 formed in the shape of an elongated block is fitted and secured to the cutout groove 24 by gluing or the like.

The cores 25 and 26 are formed as follows.

First, a block made of a magnetic material of high magnetic permeability, such as ferrite, having an E-shaped cross section is formed, and then the E-shaped block is cut so as to have a predetermined thickness, thereby forming E-shaped magnetic material including the cores 25 and 26. Arm portions of the E-shaped magnetic material having the predetermined thickness are fitted into the cutout grooves 23a, 23b and 24, respectively, with the open end of the E-shape faced downward. When the connecting side of the E-shape projecting upward from the slider 22 is cut, the separated magnetic material remains in the cutout grooves 23a, 23b, and 24 so as to become each of the cores 25 and 26. Thereafter, the cores 25 and 26 are ground together with the end surfaces of the columns 22a, 22b, 22c, and 22d so as to be flush with each other.

The cores 25 and 26 are the I-shaped cores separated from each other, and machining strain is hard to remain thereon. In addition, unlike the prior art, they are not glued by means of a non-magnetic material such as a glass, so that they are less subject to stress due to gluing. Therefore, the cores 25 and 26 do not cause internal strains, so that a reduction in magnetic permeability becomes difficult to occur, thereby improving magnetic field-generating efficiency.

In addition, a bobbin 28 is fitted onto the center core 26. A coil 27 is wound around this bobbin 28. As described above, by cutting and grinding the E-shaped magnetic material after being fitted to the slider 22, the cores 25 and 26 can be easily mounted to the slider 22, and the bobbin 28 can be fitted onto the center core 26. That is, the assembly operation is easy as compared with the prior art in which the magnetic generating section is mounted after being assembled outside.

A back plate 29 serving as a back core is formed of a magnetic material, such as a Mn—Zn ferrite or the like, similar to the side cores 25 and the center core 26, and is formed in the shape of a flat plate. The back plate 29 is formed larger than the total of areas $\alpha 1$ of joint end surfaces (base end surfaces) of the side cores 25, an area $\alpha 2$ of the joint end surface (base end surface) of the center core 26 shown in FIG. 2B, and areas $\beta$ of sections sandwiched by the joint end surfaces (base and surfaces) of the cores 25 and 26, i.e., the total area represented by a×b in FIG. 2B. In this embodiment, the area of the back plate 29 is substantially the same as, or slightly smaller than the area of the surface of the slider 22.

A thin electrical insulating layer 30 formed of a non-conductive material, such as a glass ($SiO_2$), is formed on the bottom surface of the back plate 29. The back plate 29 is glued to the end surfaces of the columns 22a, 22b, 22c, 22d, the side cores 25, and center core 26 through the insulating layer 30. The side cores 25 and the center core 26 are joined to the back plate 29 through the intermediation of the thin electrical insulating layer 30, whereby eddy current loss between the cores 25, 26 and the back plate 29 can be suppressed, thereby reducing core loss.

A flexure 12 is glued to the upper surface of the back plate 29. For example, a tongue-piece section 12a, which is shown by hatching, of the flexure 12 is glued to the back plate 29, the other hatching region 12b of the flexure 12 is secured to a load beam, etc., so that the magnetic head device is elastically supported by a suspension composed of the flexure 12 (or gimbal) and the load beam.

As shown in FIG. 2, in the magnetic head device, the bottom side of the slider (the negative Z-axis side) constitutes the surface opposed to a magnetic medium D. The magnetic head is used as a so-called flying head, and opposed to the rotating magnetic medium D with a predetermined flying distance h.

Two magnetic gaps G1 and G2 are formed between the section to which the side cores 25 and the recording medium are opposed and the section to which the center core 26 and the recording medium are opposed, with the partial intermediation of the slider therebetween. The length between these gaps G1 and G2 (gap length) is, for example, about 0.5 mm.

In addition, when current is passed through the coil 27, closed magnetic paths L1 and L2 extending via the center core 26, the back plate 29, and the side cores 25 are formed on both left and right sides of FIG. 2A, whereby a first magnetic field generating section H1 including the magnetic gap G1 and a second magnetic field generating section H2 including the magnetic gap G2 are formed. In these first and second magnetic field generating sections H1 and H2, a vertical magnetic field is imparted to the recording medium D from the common center core 26. Laser beam energy is imparted from below the recording medium D, and a signal is recorded in the recording medium D by magnetic field modulation or light modulation.

Figure 8:
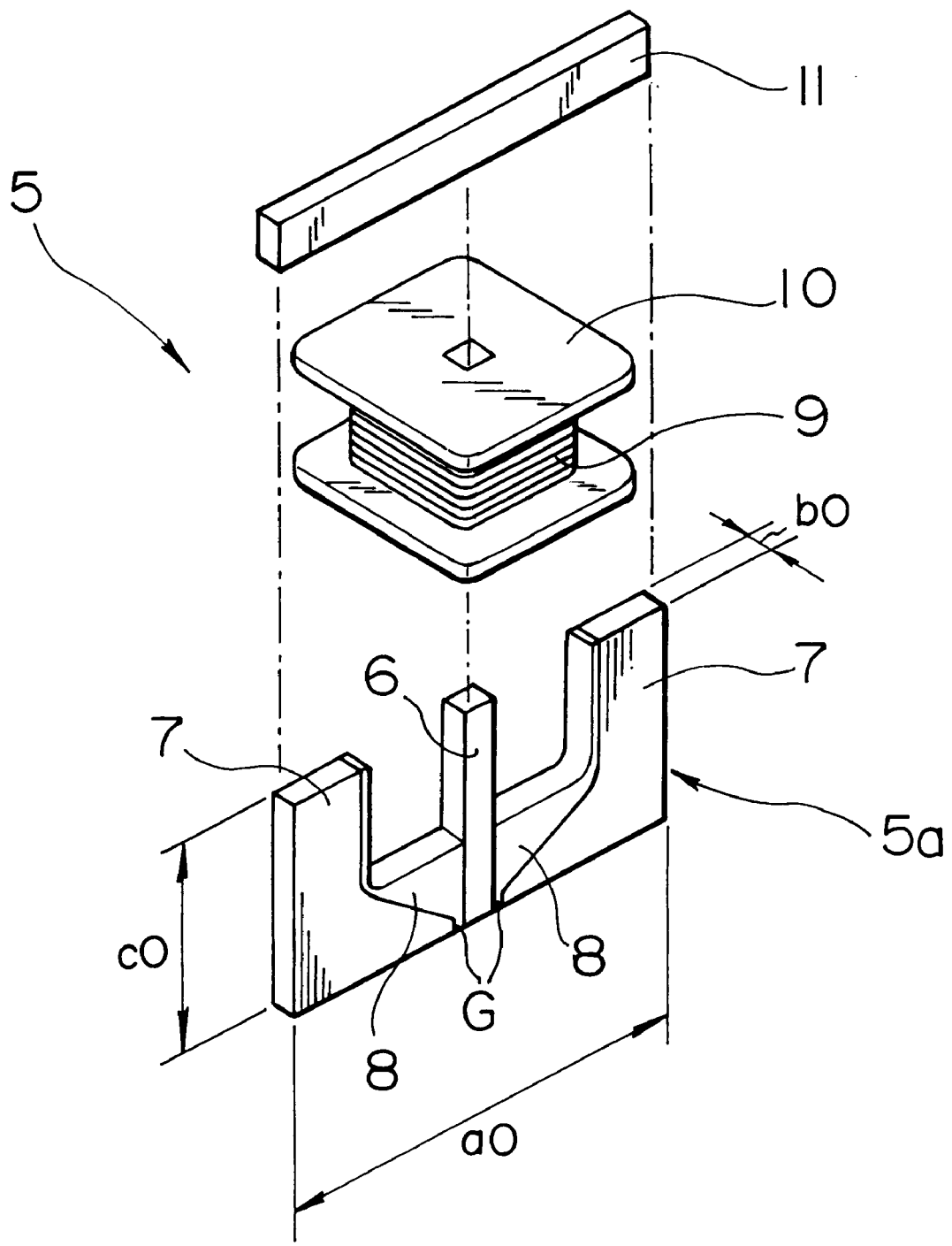
FIG. 8 is an exploded perspective view illustrating a core assembly held by a slider of the magnetic head device of FIG. 7.

In the above-described construction, the side cores 25 and the center cores 26 are formed in the shape of a rectangular prism extending in the Z-axis direction, but are not formed in the shape of L-letter extending in the Y-axis as the cores of the prior art (see FIG. 8). Therefore, the volume of the overall core in the magnetic field generating sections H1 and H2 can be reduced as compared with the prior art, and the length of the closed magnetic paths L1 and L2 can be shortened. Here, the effect of core loss (iron loss), such as hysteresis loss and eddy current loss, is produced by an amount of loss per unit volume ($W/m^3$). Therefore, the volume of the overall core can be reduced as described above, whereby the core loss generated in the magnetic field generating sections H1 and H2 can be reduced.

In addition, since the back plate 29 having a large area is joined as the back core, the heat-dissipating effect is enhanced. Further, as shown in FIG. 2A, since the sections between the side cores 25 and the center core 26 are formed of ceramic having higher heat transfer rate than glass, heat generated in the core can efficiently be transferred to the slider, and the heat spread over the slider can efficiently be dissipated into the air by an air flow at the time of flying.

EXAMPLE

Figure 5:
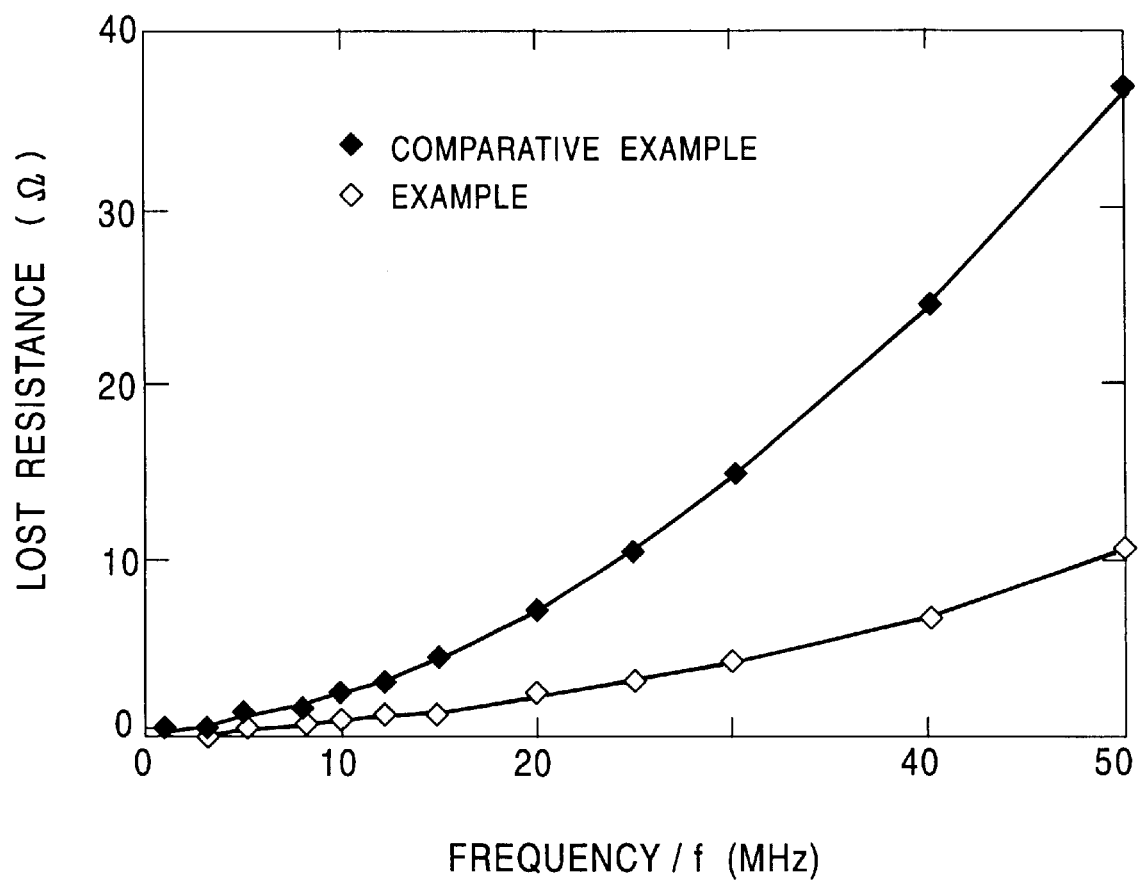
FIG. 5 is a graph in which lost resistances in the example of the present invention and in the prior art example are compared with each other in relation to recording frequency.
Figure 6:
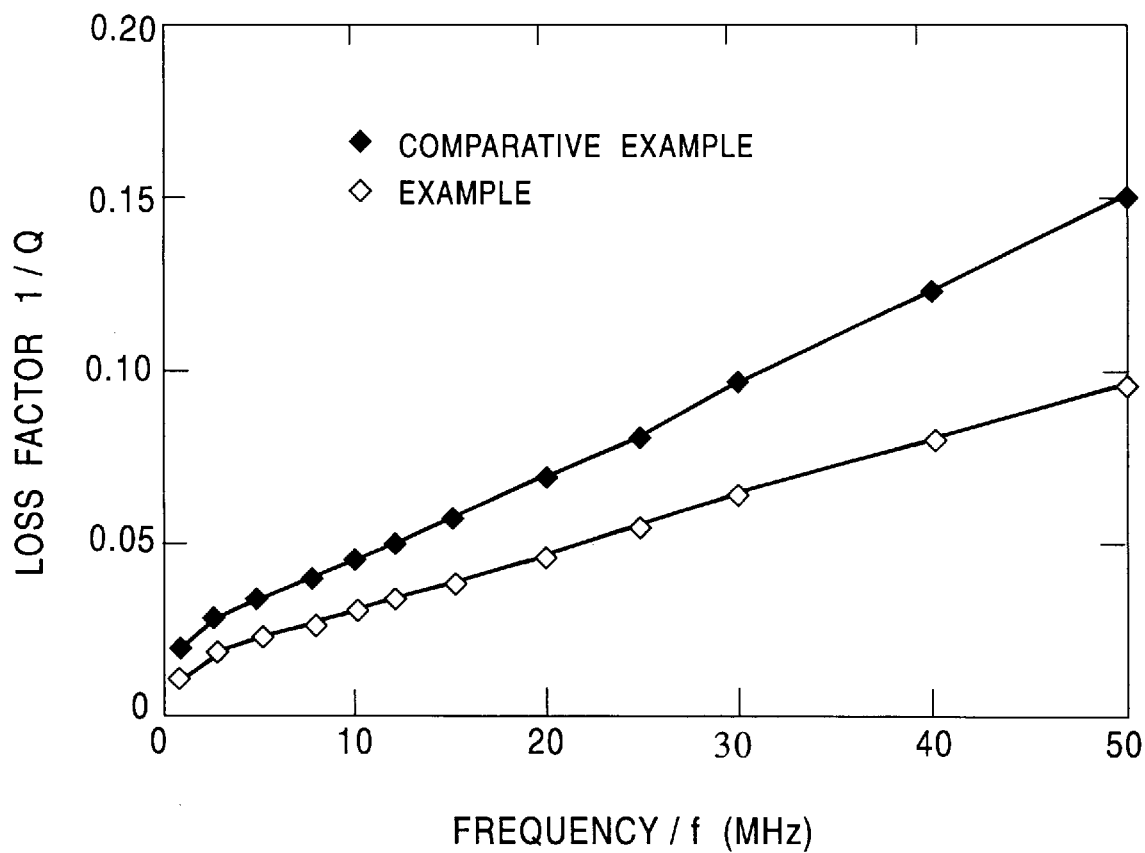
FIG. 6 is a graph in which loss factors in the example of the present invention and in the prior art example are compared with each other in relation to recording frequency.
Figure 7:
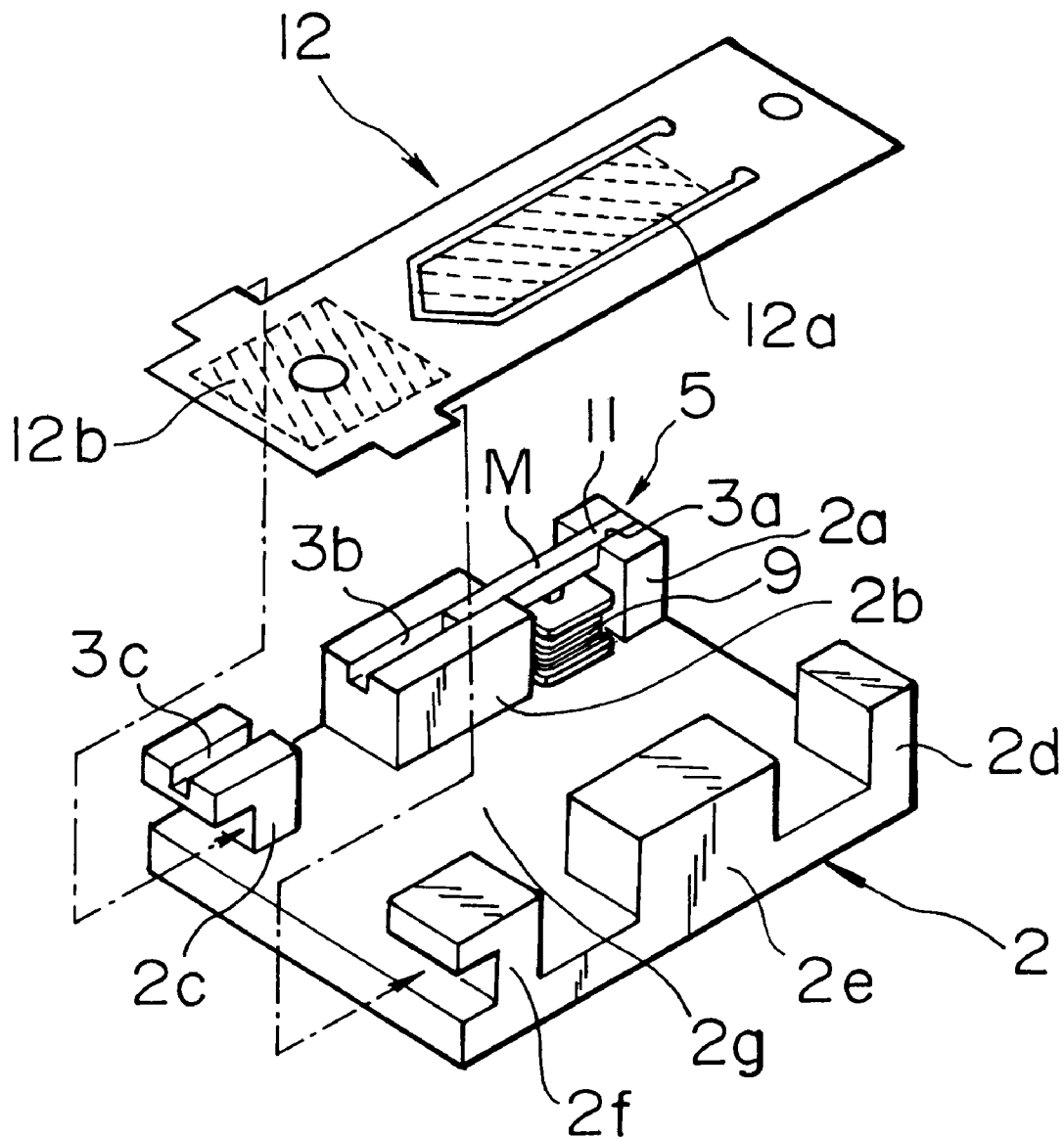
FIG. 7 is a partially exploded perspective view illustrating a conventional flying magnetic head device installed in a magneto-optical disk apparatus.

FIGS. 3 to 6 are the charts in which the characteristics of a magnetic head device according to the example of the present invention and a magnetic head device according to the prior art example shown in FIGS. 7 and 8 are compared with each other.

In the magnetic head according to the example of the present invention, the side and center cores 25 and 26, and the back plate 29 are formed of Mn—Zn ferrite, and the length a between the side cores 25 shown in FIG. 2B is 1.5 mm. More specifically, the width dimension of the side cores 25 in the Y direction is 0.2 mm, the width dimension of the center core 26 in the Y direction is 0.15 mm, and the gap length between the magnetic gaps G1 and G2 is 0.5 mm. The thickness dimension b of the side and center cores 25 and 26 is 0.15 mm, and the height dimension is 0.45 mm. The width dimension of the slider 22 in the Y direction is 2 mm, and the width dimension in the X direction is 1.6 mm. In addition, the back plate 29 has a thickness of 0.15 mm, and a plane configuration of 1.6 mm×1.8 mm. Further, the insulating layer 30 is formed of a non-magnetic material, such as glass having a thickness of 0.02 mm.

Comparative Example

The prior art example shown in FIGS. 7 and 8 is adopted as a comparative example. In the comparative example, the cores 6 and 7 of the magnetic field generating section are formed of Mn—Zn ferrite. The width dimension a0 of the E-shaped core 5a is 2 mm, the thickness dimension b0 is 0.8 mm, and the height dimension c0 is 0.8 mm. In addition, the slider has a plane configuration of 5 mm×6 mm.

Magnetic field-generating efficiency $\eta$ (Oe/mA) was equally set to 0.8 in the example and the comparative example. The number of turns of the coil at that time was 17 in the example, and 22 in the comparative example.

In FIGS. 3 to 6, the horizontal axis indicates recording frequencies ranging up to 50 MHz, and the vertical axis indicates characteristics. In each of the drawings, the curve indicated by ◇—◇ shows the example of the present invention, and the curve indicated by ◆—◆ shows the comparative example.

Figure 3:
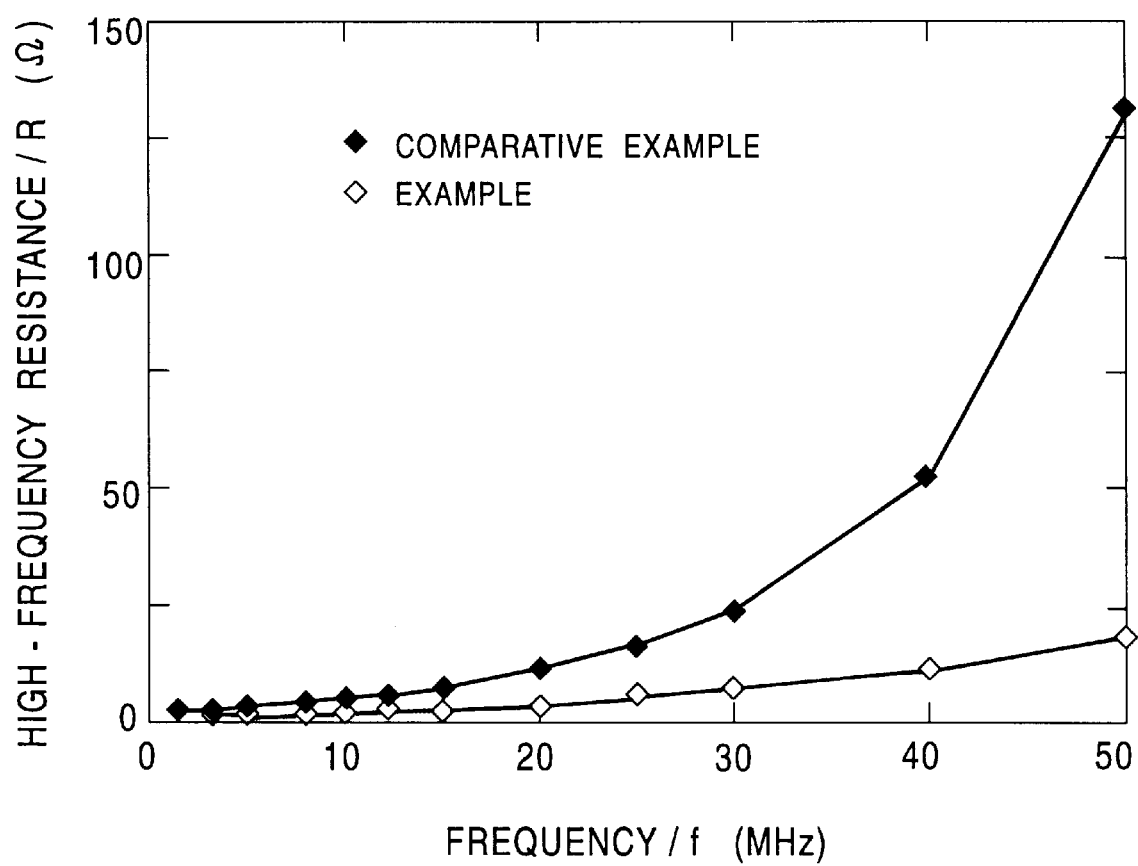
FIG. 3 is a graph in which high-frequency resistances in the example of the present invention and in the prior art example are compared with each other in relation to recording frequency.
Figure 4:
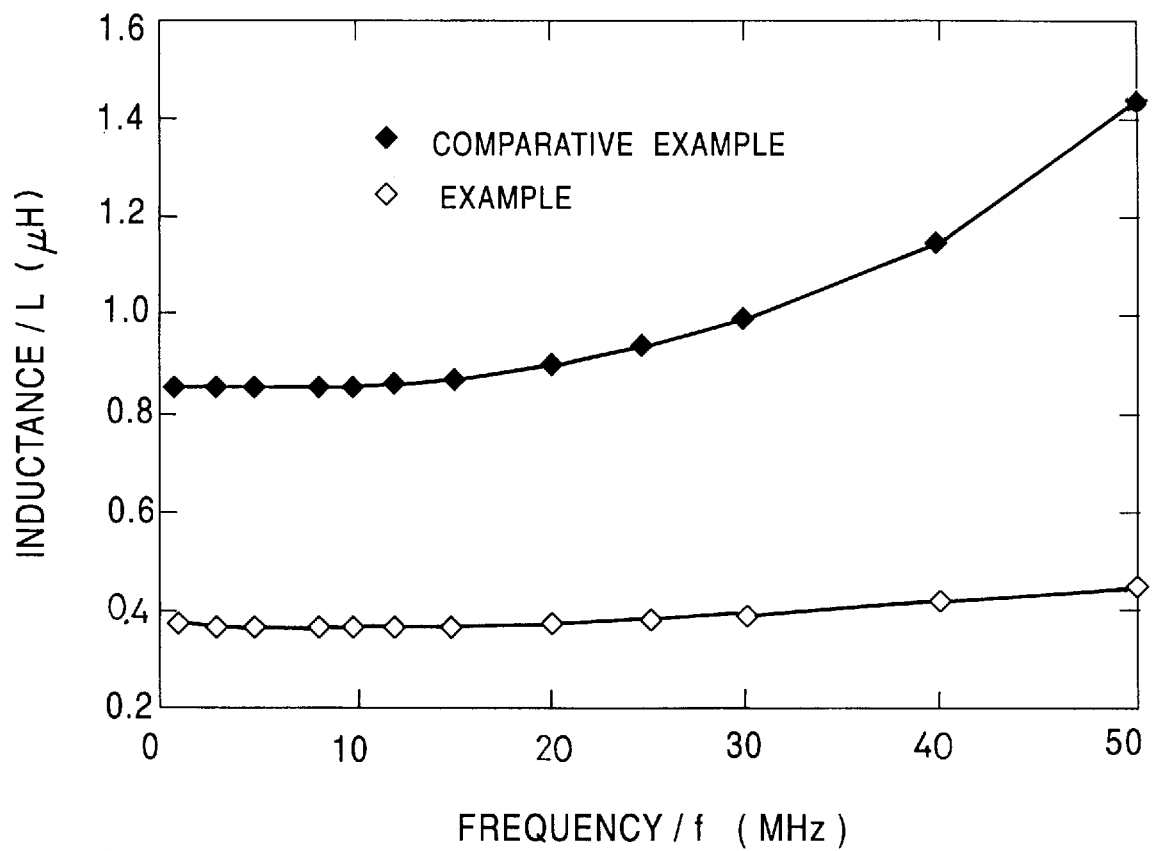
FIG. 4 is a graph in which inductances in the example of the present invention and in the prior art example are compared with each other in relation to recording frequency.

FIG. 3 gives a comparison of high-frequency resistance, FIG. 4 gives a comparison of inductance, FIG. 5 gives a comparison of lost resistance, and FIG. 6 gives a comparison of loss factor, respectively. In addition, the graphs of FIGS. 3 to 6 show results of measurements using an impedance analyzer (a Logarithmic Counting Rate meter).

According to the magnetic head device of the present invention, the core loss can be reduced as compared with the conventional magnetic head device, and heat-dissipating efficiency can be increased, so that the magnetic field-generating efficiency can be improved in any frequency band. Thus, it is possible to generate the same degree of magnetic field as in the conventional magnetic head device with the number of turns of the coil smaller than that of the comparative example. Therefore, according to the present invention, the inductance (L) of the magnetic head device can be reduced, as shown in FIG. 4, the high-frequency resistance (R) can be reduced, as shown in FIG. 3, so that the impedance viewed from the side of a driving circuit can be reduced. Further, as shown in FIGS. 5 and 6, the lost resistance {effective resistance (high-frequency resistance excluding the resistance on the coil of the magnetic head)—direct current resistance} can be also reduced, whereby the lost resistance (I/Q) can be reduced.

As described above, according to the magnetic head device of the present invention, each loss can be suppressed and the heat-dissipating efficiency can be improved, so that it is possible to suppress a rise in temperature in the magnetic head. Thus, the magnetic field-generating efficiency in the high-frequency band can be increased, thereby realizing high-density recording.

In addition, since the overall magnetic head device can be constructed in small size, flying characteristics on the recording medium are stabilized. Further, the back plate 29 having a wide area is employed as the back core, and the back plate 29 is joined to the columns 22a, 22b, 22c, and 22d which are formed integrally on the slider, so that the back plate 29 is stably mounted. By securing the back plate 29 to the suspension, it is also possible to transfer the heat to the suspension to thereby further improve the heat-dissipating efficiency.

In the present invention, the number of magnetic gaps is not limited to two, and one magnetic gap may be formed in the magnetic head device.

As described above, according to the present invention, it is possible to reduce the core loss in the magnetic field generating sections.

In addition, by increasing the heat-dissipating efficiency of the generated heat, the losses due to the heat generation can be reduced, thereby improving the magnetic field-generating efficiency.

Further, the number of turns of the coil can be decreased, whereby the inductance and the high-frequency resistance can be reduced.

What is claimed is:

1. A magnetic head device having a set of cores arranged in proximity to form magnetic gaps therebetween, a coil attached to at least one of said cores for conducting signal conversion between electrical signals and magnetic signals, and a slider for carrying said cores over a recording medium, said cores being secured in their relative positions by a non-magnetic gap material that is filled in said magnetic gaps to improve the magnetic characteristics of said cores, said magnetic head device characterized in that:

said slider is formed of a non-magnetic ceramic material and has a top surface and a bottom surface facing said recording medium, said slider including columns standing from said top surface thereof and each having a top end;

said cores are formed of a magnetic material and each have a first end surface and a second end surface, said cores being individually mounted through said slider in such a manner that said first end surfaces of said cores will become substantially coplaner with said bottom surface of said slider and that sections of said slider existing between said cores will form said magnetic gaps and function as said non-magnetic gap material to improve the magnetic characteristics of said cores; and said magnetic head device further includes a back core formed in the shape of a flat plate the area of which is equal to or larger than the total area of said first end surfaces of said cores plus the total area of said magnetic gaps in said bottom surface of said slider, said back core having a bottom surface joined to said second end surfaces of said cores and said top ends of said columns.

2. A magnetic head device according to claim 1, wherein each of said cores is embedded in each of said columns.

3. A magnetic head device according to claim 2, wherein a suspension is attached to said back core for elastically supporting said magnetic head device.

4. A magnetic head device according to claim 1, wherein a suspension is attached to said back core for elastically supporting said magnetic head device.

5. A magnetic head device according to claim 1, wherein an electrical insulating layer is formed on said bottom surface of said back core.

6. A magnetic head device having a set of cores arranged in proximity to form magnetic gaps therebetween, a coil attached to at least one of sad cores for conducting signal conversion between electrical signals and magnetic signals, and a slider for carrying said cores over a recording medium, said cores being secured in their relative positions by a non-magnetic gap material that is filled in said magnetic gaps to improve the magnetic characteristics of said cores, said magnetic head device characterized in that:

said slider is formed of a non-magnetic ceramic material and has a top, surface and a bottom surface facing said recording medium, said slider including columns standing from said top surface thereof and each having a top ends;

said cores are formed of a magnetic material in the shape of an elongated block and each have a first end surface and a second end surface, said cores being individually mounted through said slider in such a manner that the first end surfaces of said cores will become substantially coplanar with the bottom surface of said slider and that sections of said slider existing between said cores will form said magnetic gaps and function as said non-magnetic gap material to improve the magnetic characteristics of said cores; and said magnetic head device further includes a back core having a bottom surface joined to said second end surfaces of said cores and said top ends of columns.

7. A magnetic head device according to claim 6, wherein each of said cores is embedded in each of said columns.

8. A magnetic head device according to claim 7, wherein a suspension is attached to said back core for elastically supporting said magnetic head device.

9. A magnetic head device according to claim 6, wherein an electrical insulating layer is formed on said bottom surface of said back core.

10. A magnetic head device having a set of cores arranged in proximity to form magnetic gaps therebetween, a coil attached to at least one of said cores for conducting signal conversion between electrical signals and magnetic signals, and a slider for carrying said cores over a recording medium, said cores being secured in their relative positions by a non-magnetic gap material that is filled in said magnetic gaps to improve the magnetic characteristics of said cores, said magnetic head device characterized in that:

said slider is formed of a non-magnetic ceramic material and has a top surface and a bottom surface facing said recording medium, said slider including columns standing from said top surface thereof and each having a top ends;

said cores are formed of a magnetic material and each have a first end surface and a second end surface, said cores being individually mounted through said slider in such a manner that said first end surfaces of said cores will become substantially coplaner with said bottom surface of said slider and that sections of said slider existing between said cores will form said magnetic gaps and function as said non-magnetic gap material to improve the magnetic characteristics of said cores; and said magnetic head device further includes a back core having a bottom surface joined to said second end surfaces of said cores and said top ends of said columns.

11. A magnetic head device according to claim 10, wherein each of said cores is embedded in each of said columns.

12. A magnetic head device according to claim 11, wherein a suspension is attached to said back core for elastically supporting said magnetic head device.

13. A magnetic head device according to claim 10, wherein a suspension is attached to said back core for elastically supporting said magnetic head device.

14. A magnetic head device according to claim 10, wherein an electrical insulating layer is formed on said bottom surface of said back core.

\* \* \* \* \*

UNITED STATES PATENT AND TRADEMARK OFFICE
CERTIFICATE OF CORRECTION

PATENT NO. : 5,943,188
DATED : August 24, 1999
INVENTOR(S) : Toshio Kazama

It is certified that error appears in the above-identified patent and that said Letters Patent is hereby corrected as shown below:

In claim 1, line 19, change "coplaner" to --coplanar--.

In claim 6, line 3, change "sad" to --said--.

In claim 6, line 11, delete "," (comma) after "top".

In claim 10, line 14, change "ends" to --end--.

In claim 10, line 19, change "coplaner" to --coplanar--.

Signed and Sealed this

Second Day of May, 2000

Attest:

Q. TODD DICKINSON

*Attesting Officer*    *Director of Patents and Trademarks*